United States Patent
Mandle et al.

[11] 3,773,646
[45] Nov. 20, 1973

[54] ELECTROPHORESIS TEST KITS

[75] Inventors: Richard Max Mandle, Pompton Lakes, N.J.; Howard Edward Bond, Montgomery County, Md.

[73] Assignee: Electro-Nucleonics Laboratories, Inc., Bethesda, Md.

[22] Filed: May 12, 1972

[21] Appl. No.: 252,639

[52] U.S. Cl. .............................. 204/299, 204/180 G
[51] Int. Cl. .............................................. B01k 5/00
[58] Field of Search ................. 204/180 G, 180 S, 204/299

[56] References Cited
UNITED STATES PATENTS

| | | | |
|---|---|---|---|
| 3,371,027 | 2/1968 | La Paglia et al. | 204/299 |
| 3,396,096 | 8/1968 | Belote et al. | 204/299 |
| 3,421,998 | 1/1969 | Yallen | 204/299 |
| 3,432,414 | 3/1969 | Rand | 204/180 R |
| 3,494,846 | 2/1970 | Arquembourg | 204/180 G |
| 3,635,808 | 1/1972 | Elevitch | 204/180 G |
| 3,674,678 | 7/1972 | Post, Jr. et al. | 204/299 |
| 3,691,054 | 9/1972 | Cawley | 204/299 |

Primary Examiner—John H. Mack
Assistant Examiner—A. C. Prescott
Attorney—Jesse C. Bowyer

[57] ABSTRACT

An integral gel bridge and legs and wells test kit unit is provided, the unit being adapted for use with a low voltage electrophoretic testing system. Improvements in the construction of the test kit unit and various specific embodiments thereof for use in specific tests are provided. Also provided are methods of producing such test kit units incorporating means for prevention of syneresis of the gel components and also incorporating means to increase the rate of accuracy of reproducability of test kits and test results.

68 Claims, 27 Drawing Figures

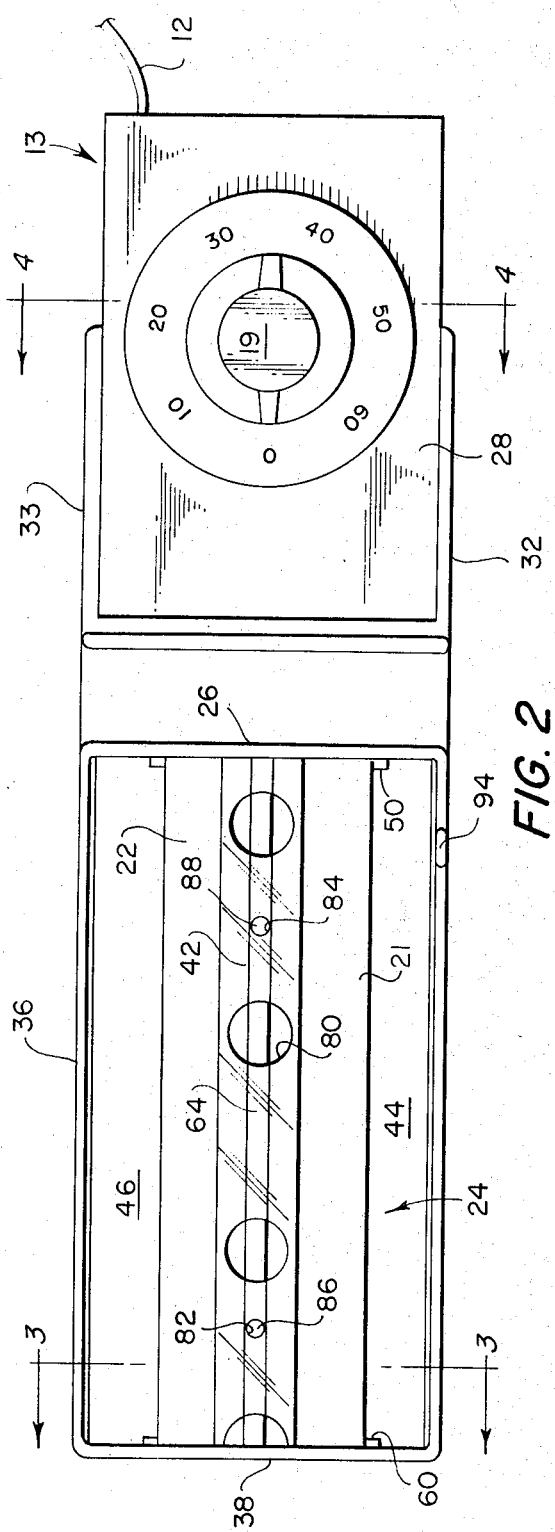
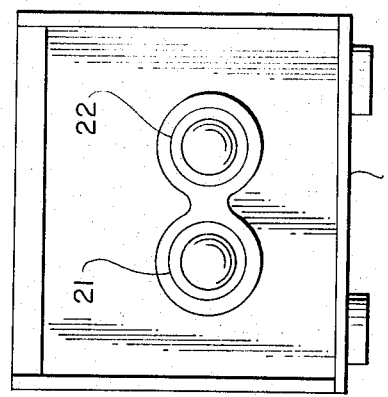

ELECTROPHORESIS TEST KITS

BACKGROUND OF THE INVENTION

The present invention relates to electrophoresis test kits and to simplified methods of making such kits for use with an analytical electrophoretic test system such as that disclosed and claimed in our copending application, filed even date herewith, and entitled "Low Voltage Electrophoretic Testing System."

The testing of fluids such as blood sera and similar sera, or other similar liquids, for analytic and research purposes has increased many hundred-fold in recent years and, as a consequence, a large variety of systems for testing such sera, both qualitatively and quantitatively, have been investigated and have been produced by the prior art.

Among the most promising of such systems is that generally denominated as electrophoresis. In its most generic sense electrophoresis is a process involving the movement of a charged particle suspended in a liquid due to the presence of an electrical field in electrically coacting relationship with the particle.

While a variety of systems are available to the researcher or to clinical testing personnel in the generic field of electrophoresis, those systems which have been found to be generally most attractive from the standpoint of economics and of dependability, i.e., reproduceable results, and of similar desirable features have related to the type of system generally designated as gel electrophoresis or gellified immunoelectrophoresis.

The generic term double diffusion is commonly used to describe gel tests (whether such tests are electrophoretic in nature or not) wherein two components, capable of reaction with each other, are placed in contiguous wells, or other similar openings, contained within a gel layer. In such systems the forces of movement cause the two components to diffuse in generally universal directions; hence, if the starting wells are placed sufficiently close together, the materials placed therein will meet at one or more boundary lines. At this line, or lines, the materials may, if properly selected, precipitate and form at least one precipitin line, or they may form one or more boundary lines of long chain, agglutinated molecules. In most cases, these boundary lines are visible to the naked eye, and, if they are not, they can be made visible or their position determined by known methods. Such an immunodiffusion process, when occurring in an applied electrical field, is generally termed immunoelectrophoresis.

In systems utilizing such electrophoresis, a first composition is placed in a first well which is formed in a layer of gel and a second composition is placed in a second adjacent, or paired well formed in the same layer of gel. By placing these two wells between sources of opposite electrical polarities the materials contained in these wells are caused to migrate towards each other through the gel. If, for example, one of the materials is an antigen, hereinafter referred to as A$g$, and the other material is an antibody, hereinafter referred to as A$b$, and these materials are reactive with each other, then if A$b$ is placed in one of the pair of wells and A$g$ is placed in the other paired well, and an electrical field is positioned with the wells placed therein between sources of opposite polarity so as to cause the migration of the A$g$ and A$b$ towards each other, then there will be a position or band of positions in the gel layer in which the molecules of these two meet. If, as stated, A$b$ and A$g$ are mutually reactive, then a detectable precipitin line, or lines, will form wherein the A$g$ and A$b$ meet. Such a line, or lines, may be straight or arcuate, depending upon the conditions utilized.

Accordingly, such a system of electrophoresis may be used to analyze known A$b$ against unknown A$g$ and vice-versa, in order to determine the identities or presences thereof.

As one specific example of such a material which is commonly tested, reference is made to Hepatitis-associated (Australian) Antigen (HAA). This antigen is associated with the disease generally called Serum Hepatitis, in contrast to Viral Hepatitis. It has only been in the most recent years that the wide prevalence of Serum Hepatitis has become fully evident. Studies made in this field indicate that the so-called Australian A$g$ (HAA) is associated with the causative agent for Serum Hepatitis.

Since Serum Hepatitis and HAA are more prevalent in the blood of professional donors or in the blood of individuals who have been subjected to frequent exposure to hypodermic techniques, it is becoming increasingly important before transfusion of blood to human patients that all such supplies of blood be tested to make certain they are not contaminated with Serum Hepatitis.

SUMMARY OF THE INVENTION

The present invention discloses and embraces electrophoresis test kit units which are practical for low voltage electrophoresis. These test units incorporate in all of the embodiments thereof wells which are accurately and reproducably positioned so that well position deviation from unit to unit is minimal. The wells are formed in a relatively thin bridging layer of gel to which are joined integral gel legs.

This thin bridging layer of gel constitutes the large majority of the ohmic resistance of the entire generally U-shaped gel portion of the test kit unit, i.e., takes up most of the entire voltage drop of the gel unit, there being no other electrical path or source of ohmic resistance within the test kit units except for the gel path therethrough comprising a first relatively large, thick gel leg integrally connected to a relatively thin gel bridging layer having wells formed therein and a second relatively large, thick gel leg integrally connected to the other side of the bridging layer. Preferably about 90 per cent of the voltage drop takes place in the gel bridge layer, i.e., in the immediate vicinity of and including the test wells, while only about 10 per cent of the voltage drop occurs outside thereof.

In the preferred embodiments of the invention the test kit units are manufactured by processes which result in units having long shelf storage without syneresis, or endosmotic flow, and in which both during storage and during the electrophoretic test run the gel portions are supported in substantial immobility by substantially rigid and substantially enclosing members.

Obviously, since HAA tests and similar electrophoretic tests must be performed in the millions, it is essential that a test apparatus and system be available therefor which are economical, dependable as to repeatability, and capable of efficient operation by relatively inexperienced personnel. This is accomplished by the present invention which simultaneously minimizes the chances of danger to such personnel from both the electrical portion of the equipment and the possible infectious material-containing portion thereof.

The test kit units of the invention are preferably so inexpensive that they are single-use units; i.e., the entire test kit may be discarded after a single test run. Such systems are generically known in the prior art, as exemplified by Oliva et al. U.S. Pat. No. 3,407,133, wherein expendable electrophoresis units are described and illustrated in detail, the present invention incorporating substantially different and improved structures, including various modifications thereof, together with novel processes for the production thereof.

At the same time, it is desirable that such a system and the individual components thereof be adaptable for use in conducting a plurality of diversified tests for various diseases or the like, and that they also be adaptable, as individual components and as an entity, as a reusable or permanent system for experienced research workers.

The present invention combines these advantages and still allow a single, relatively inexperienced, technician to test as many as 1,000 samples per day.

While a large variety of testing units and systems for gel film electrophoresis have been proposed in the prior art, most such systems, and the system with which the test kits of the present invention are to be used, utilize two similar and generally parallel, separate tanks into which are inserted electrodes of opposite plurality; each of the tanks usually contains the same selected electrolyte, and these tanks or compartments may be further divided by baffle walls into compartments or wells.

Dipping into each of the wells of the prior art devices is a separate wick element. Bridging the gap between the tank compartments and the wicks is a layer of gel or the like whose ends are connected mechanically and electrically with the electrolyte solution tank compartments or wells by means of such wicks in the prior art devices. In the test kit units of the present invention a pair of gel legs substantially integrally joined by a gel layer are substituted for such prior art devices, eliminating the high resistance wicks.

In essence, according to the present invention and in contrast to the prior art devices, all of the surfaces of all of the preformed components of the test kit units which come in contact with the gel serve the dual functions of (a) providing in toto the sole molding surface means which define the final configurations of the agar or other gel portions of the test kit unit, including the test wells thereof, and (b) providing in toto the sole supporting and positioning means for the gel portions of the test kit units, including the legs, bridge and wells thereof in the final assembled test kit units as used during an electrophoretic test run. This is accomplished by the structures and methods of forming the same described in detail hereinafter.

A large variety of gel materials may be utilized in the test kit units described herein. The most common gel for such use in an agar or agarose which has been buffered with a mildly alkaline buffer such as a tris buffer or a barbituate buffer or the like. Other known gel-like materials have such utility for electrophoretic purposes are silica, pectin, starch, acrylamide, agar-acrylamide, etc. However, the use of agar is genrally recommended because of its relative inexpensiveness and of its availability, if desired, in pure form. Additionally, it should be noted that the percentage of water in gelled agar is extremely high, so that the gelled agar does not offer high molecular sieve resistance to the migration of particles therethrough. Accordingly, properly buffered purified agar or agarose gel is the preferred material for use in the present invention.

For a more complete description of such gels, including the details of manufacture and composition thereof, reference is made to *Immunoelectrophoretic Analysis* by Piere Grabar, *Methods of Biochemical Analysis*, Volume VII, pages 3–12 (1959), *Immunodiffusion and Immunoelectrophoresis* by Orjan Ouchterlony, Ann Arbor Science Publishers, Inc., Pages 4–8 (1968), and *Methods in Immunology and Immunochemistry*, edited by Williams and Chase, Academic Press, Volume II, Appendix II, Volume III, pages 118–198 and 237–292 and 357–365 (1971).

Among the more difficult problems of the prior art systems in gel electrophoresis has been the necessity of providing an elaborate cooling system, since the heat generated in the gel layer and in the remainder of the system is directly proportional to $I^2R$, and the prior art systems utilize relatively high voltage and currents. This heat loss is minimized in the system of the present invention by utilizing a constant low current and low current density, and by the use of a relatively large, and thin gel film area. Hence, the provision of a cooling system is unnecessary, as is explained more fully hereinafter.

In gel systems such as those described herein, there is a flow toward the cathode which is generally termed electro-osmotic flow and involves the entire solvent phase. This is because the agar or similar gel matrix generally is negatively charged but is prevented from moving. It is generally assumed that this net negative charge of the matrix is due to the ionization of inorganic acid or other groups.

Such a fixed charge is apparently partially balanced by the positive charge of the solvent per se, which moves toward the cathode, so that in any event the entire fluid phase and all of its solutes have a net cathodic flow.

In a two component solute system, one of the components may be selected and utilized at a pH such that this component is isoelectric, and this is done for the reason that it is best to obtain a precipitin line which is located in the mid-point between the wells containing the reactants, which may be achieved if the proper pH is so selected that such material within one of the wells is isoelectric, i.e., has no net electrical charge. Such material will then move substantilly solely by electroosmotic flow or end osmosis, while the other component material will flow as a result of the electrical charge. For example, in the present system if A*b* is used in the wells on one side of a test plate, i.g. closest to the anodic side, the solvent pH could be adjusted to a value of 8.2 to 8.6, so that such A*b* particles are chargeless and are caused to move mainly by the repulsion of the negatively charged liquid to the negative charges in the gel structure, whereas the A*g* contained in the other series of cells closest to the cathodic side is caused to move toward the anodic side mainly by the force of the applied electrical field. This process is frequently called counterleectrophoresis.

BRIEF DESCRIPTION OF THE DRAWING

FIG. 2 is a top plan view of the combined timer and constant current unit and electrolyte compartmental housing of the testing system described and claimed in detail in the referred-to copending application;

FIG. 3 is a vertical sectional view taken on the line 3—3 of FIG. 2;

FIG. 4 is a vertical sectional view taken on the line 4—4 of FIG. 2;

DETAILED DESCRIPTION OF THE INVENTION

Figure 1:
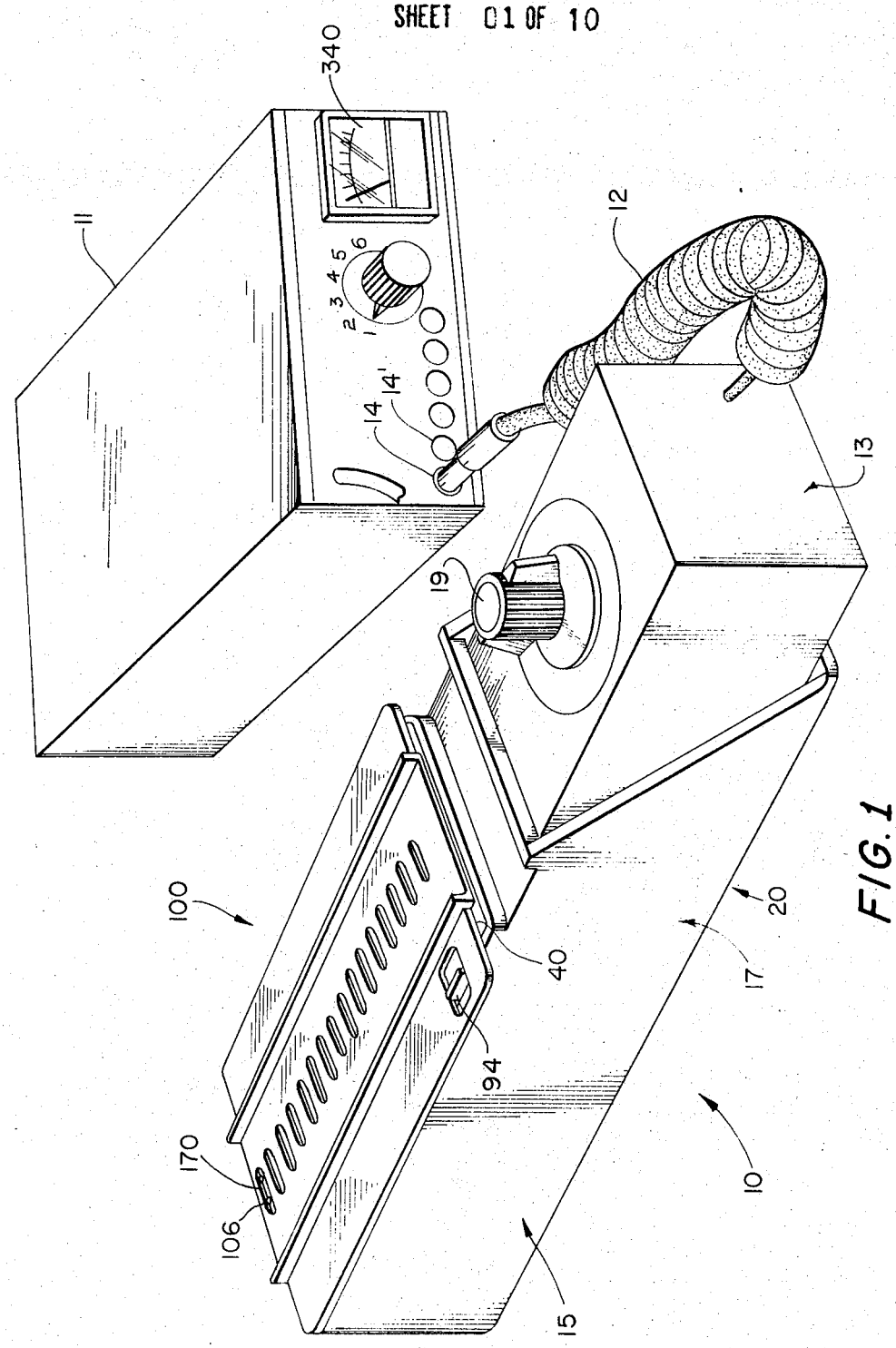
FIG. 1 is a perspective view of the overall electrophoretic testing system with a test kit unit in operable position.

Reference is made to the figures of the drawings, wherein the overall test system 10 showing the overall electrophoresis test kit unit 100 of the present invention is illustrated in its entirety in FIG. 1 and includes those components which form the subject matter of the copending application. Basically, such a system includes a supply 11 of standard alternating current voltage which is fed to a transformer and test unit, which by means of a step-down, isolation, transformer and AC/DC rectifier (not shown), provides a plurality of voltage outlets 14, 14' each having, for example, an adjustable available voltage of less than 30 volts of DC potential, such voltage being capable of regulation, such as over a range of about 15 to about 30 volts.

The series of connecting sockets or outlets 14, 14' are provided on this supply unit 11. Each of these is connected, by appropriate leads, indicated at 12, to a separate control and timer unit 13 and to an electrode unit 15 and carried by a housing member 17.

Each control and timer unit 13 produces for a desired time set by a manual or similar timer knob, indicated at 19, a substantially constant current output maintained, for example, at about 19 milliamps, plus or minus one.

The constant current and timer unit 13, best shown in FIGS. 1 and 2 has connected thereto two preferably cylindrical electrodes 21 and 22, formed of material such as porous carbon or the like, and these are substantially contained within an electrolyte compartment 24 forming a part of the housing member 17. The housing member 17 has a vertical wall 26 which carries in fluid sealing relation electrodes 21 and 22 and which divides this compartment 24 from the other or outer compartment 28 containing the timer and control elements electrically connected to the electrodes by sockets or the like. The entire housing member 17 has a base wall 30. The base wall 30 and side walls 32 and 33 of the outer compartment are preferably slightly resilient and preferably frictionally support the power control unit 13 in oriented position with the electrodes connected thereto and sealingly extending into the forward electrolyte compartment 24 thru wall 26.

The electrolyte compartment 24 is provided with side walls 35, 36 having substantially equal height and an end wall 38, also, preferably of the same height, as is wall 26. Walls 26, 30, 35, 36 and 38 define the electrolyte compartment leaving an open top thereto indicated at 40.

Positioned within the electrolyte compartment 24 is a vertical longitudinal dividing wall 42 which is joined to walls 30, 26 and 38 in fluid sealing relation and may be integrally formed therewith. The electrolyte tank 24 is thus divided into two electrolyte compartments or tanks 44 and 46, one for each of the electrodes 21 and 22, one of which is an anode and the other of which is a cathode.

This second wall 42 which is longitudinally extending in the direction of the axes of the electrodes 21 and 22, as shown, electrically isolates these two electrodes from each other so as to divide the forward compartment into these two side-by-side, separate, liquid-proof compartments 44 and 46. Both of these compartments are filled to or near the top thereof with an appropriate electrolyte solution, containing an appropriate buffer, the composition of the solution being compatible with the selected test. As explained, one side compartment and the electrode and electrolyte contained therein are of positive polarity, while the opposite side compartment and the electrode and electrolyte contained therein are of opposite, negative polarity, the choice of polarity being optional.

Positioned adjacent the bottom of the electrolyte compartment 24 contiguously to wall 26 is a parallel-extending member 50 which has a slot 51 for wall 42 and support saddles 52, 54 for electrodes 21 and 22. Also formed thereon are slots 56 and 58. A member 60 substantially identical to member 50 is positioned adjacent and parallel to wall 38 within compartment 24. Members 50 and 60 may be integrally formed with the wall elements, if desired, and serve as supports for the electrodes 21 and 22, for dividing wall 42 and for a shield member 62, preferably formed of transparent, electrically insulative, plastic material, which shield serves as a baffle member for connection circulation of the electrolyte around the electrodes.

Shield 62 has an upper horizontally extending shelf or wall 64 supported on the top 66 of the dividing wall 42. Generally vertical legs 68 and 69 extend downwardly from shelf 64 and, as shown, preferably have slanting portions 70 and 72 and outer vertical portions 74 and 76 which fit into slots 56 and 58 and their mating slots at the opposite ends of tank 24. Circulation holes for the electrolyte and heat, indicated at 80 are provided and the electrolyte is free to circulate between bottom wall 30 and the bottoms 77, 78 of vertical legs 68 and 69. If desired, holes 82 and 84 may be provided in shield 62 to frictionally fit on pegs 86 and 88 formed on top 66 of wall 42.

The tops 90 and 92 of side walls 35 and 36 preferably serve as supports for the test kit units 100 of the present invention during the actual electrophoretic test runs; the shelf 64 may also be used for support purposes. A projection or the like indicated at 94, is provided on one of the walls to provide a registration positioning means for insuring positioning of the test kit units in proper orientation relative to the cathodic and anodic tanks.

PREFERRED EMBODIMENTS OF THE ELECTROPHORESIS TEST KIT UNITS

Figure 5:
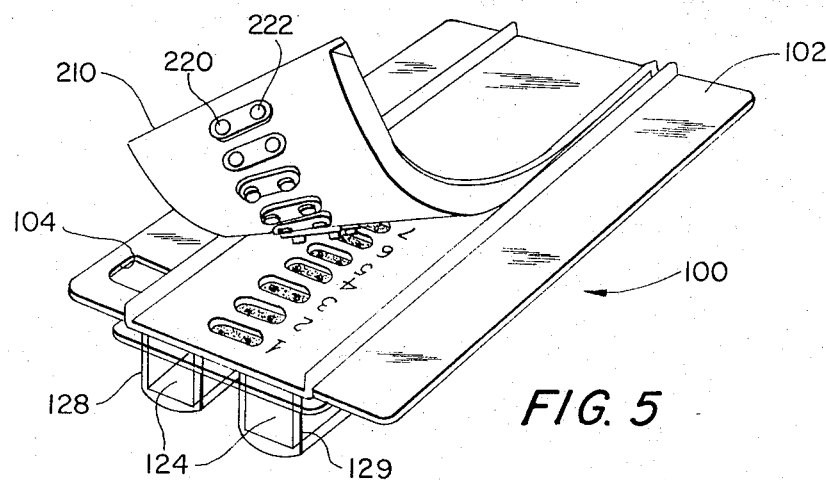
FIG. 5 in a view in perspective of a preferred embodiment of a test kit unit of the invention with the well forming and sealing cover unit partially peeled away.
Figure 6:
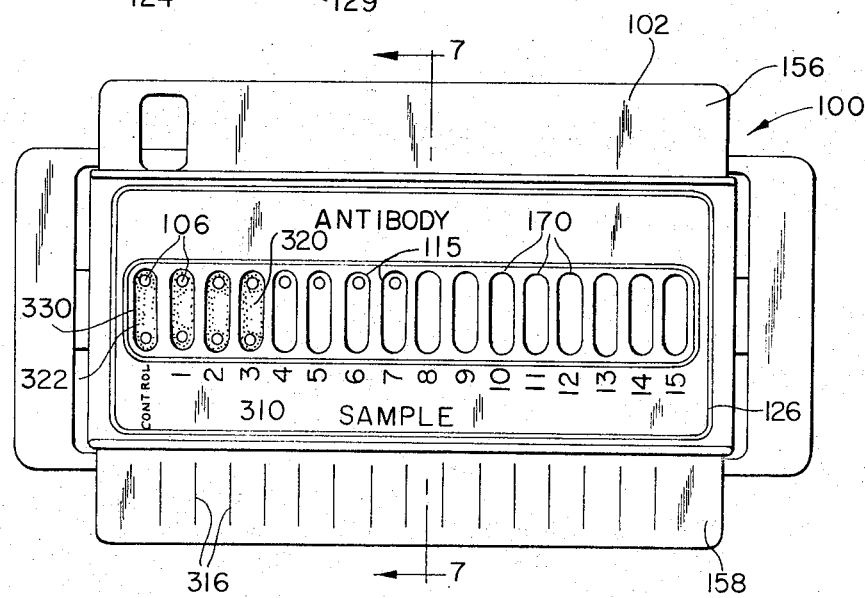
FIG. 6 is a top plan view of a test kit unit of a preferred embodiment with the cover completely removed.
Figure 7:
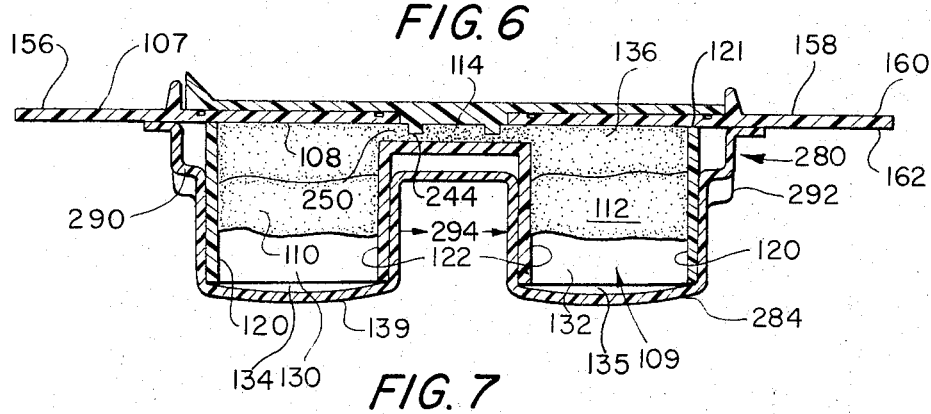
FIG. 7 is a vertical sectional view taken on the line 7—7 of FIG. 6 but with the cover fully positioned in hermetic sealing relation and with a bottom sealing member positioned on the test kit unit legs.

A preferred embodiment of the test kit unit, particularly for use in hepatitis testing, is shown in FIGS. 5, 6 and 7 and is indicated in its entirety as 100. This test unit 100 includes a substantially rigid plate 102 having an upper surface 107 and a lower surface 108 and which plate extends generally horizontally and has formed thereon a locating means, shown here as a recess or notch 104, which coacts with the described projection 94 or the like formed one of the walls of the compartment. This is done so that the test kit must be properly positioned with the specimen wells 106, 106 in the gel bridge 114 thereof in proper polarity relationship with the electrolyte tanks 44 and 46 containing electrodes 21 and 22 of opposite polarity.

Figure 8:
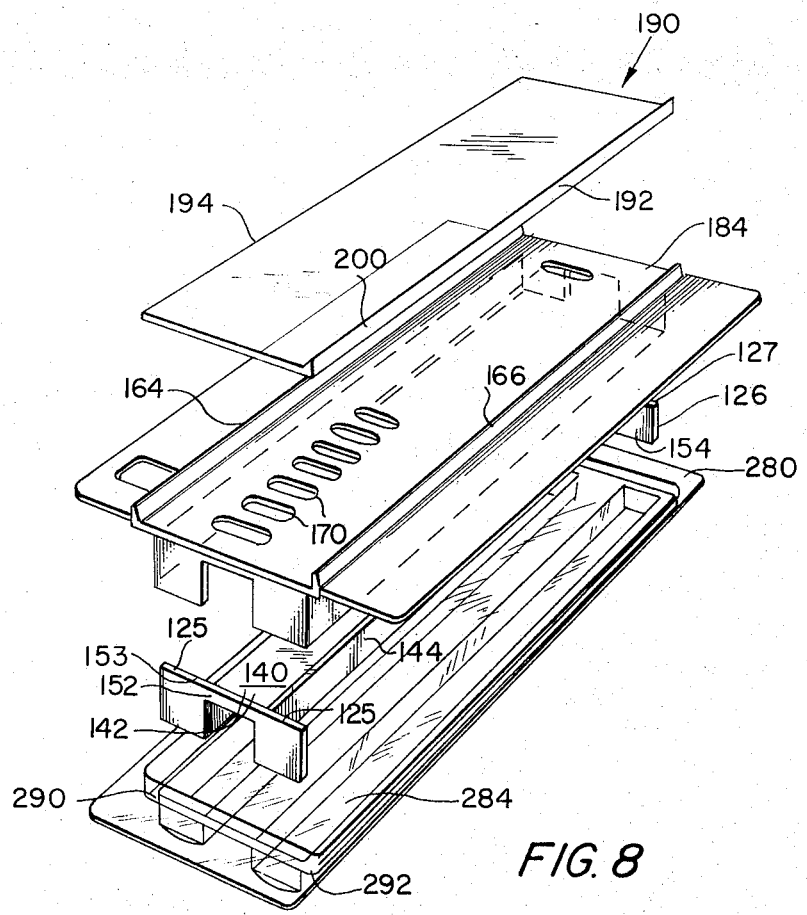
FIG. 8 is an exploded view of a preferred embodiment of the invention.

The test kit 100, which in a preferred embodiment is expendable and is molded from plastic components, has formed therewith and substantially enclosed therein a low ohmic resistance, integral gel unit 109, having two spaced, generally vertically depending, generally parallel gel legs 110 and 112 which are interconnected by an integral gel bridge 114, preferably forming a unit substantially like an inverted U in shape with the base thereof substantially thinner than the legs. The gel legs base thereof substantially thinner than the legs. The gel legs 110 and 112 are, as shown, in the form of relatively large, relatively thick blocks having their larger horizontal dimensions or longitudinal axes generally parallel to the rows 115 of the wells 106, the longitudinal axis of bridge layer 114 also being parallel thereto, and are substantially formed by, and defined as to dimensions by, the four generally downwardly depending, perpendicular side walls 120, 122, 124 and 126 of downwardly depending, substantially rigid, molding pipes or legs, 128 and 129, in combination with plate 102. The legs 128 and 129 are preferably generally perpendicular to plate 102, and the bottoms 130 and 132 of such legs are initially left open, or uncovered, for a purpose explained more fully hereinafter. Gel legs 110 and 112 are preferably convex shaped as shown at 134 and 135, so that they extend beyond the bottoms 130 and 132 of plastic legs 128 and 129. The bottoms of the gel legs on all of the embodiments of the invention are preferably so found to insure full contact between the gel legs and the electrolyte solutions. Side walls 120, 124 and 126 have, respectively, top walls 121, 125 and 127 which are integrally joined to the bottom wall or surface 108 of plate 102 in fluid sealing relation. At the tops 136 and 138 of the troughs or legs 128, 129, see FIGS. 7 and 8, and extending therebetween in fixed relation thereto, is a bridge member 140, preferably formed of the same plastic material as are the other components of the test unit. As shown in FIG. 8, this bridge member 140 has an upper surface 142 and may be frictionally held in position between walls 120, 122, 124 and 126 of the leg members 128, 129, in which case it has vertically depending spaced walls 144, 144, or it may be affixed thereto by means of adhesives or by being integrally formed therewith by molding or the like.

Figure 10:
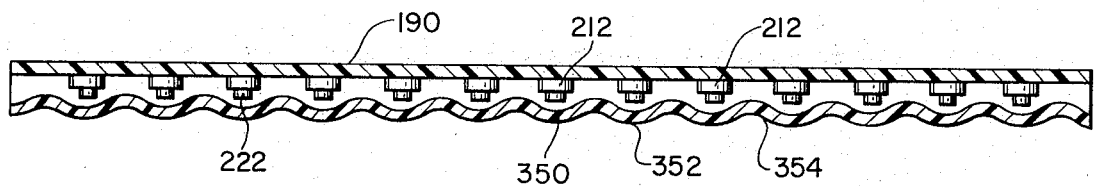
FIG. 10 is a partial side elevational view of a first alternative embodiment of the gel bridge and bridge molding support configuration of the invention.
Figure 11:
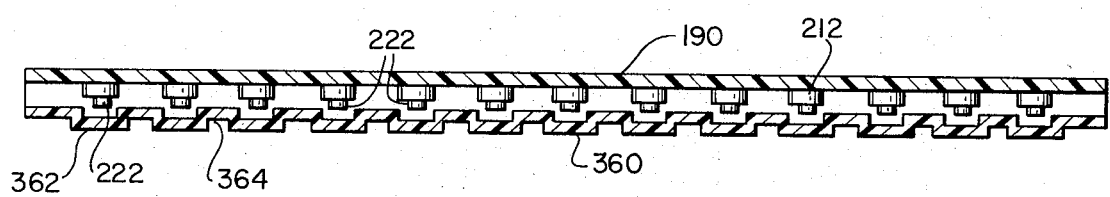
FIG. 11 is a partial side elevational view of a second alternative embodiment of the gel bridge and bridge molding support configuration of the invention.

In its longitudinally extending axial direction, i.e., from end to end thereof, the axes of both this plastic, preferably transparent, bridge 140 and of the gel layer bridge 114 are generally parallel to the axes of the electrodes, and in cross-section may be uniplanar, sinuously curved or alternately stepped, as best shown in FIGS. 8, 10 and 11, and as described more fully hereafter.

At one end 150 of this bridge 140 there is preferably positioned a spacing, vertically extending end wall 152, having a top wall 153, and at the opposite end 154 of the bridge 140 there is preferably positioned a similar spacing, vertically extending end wall having a similar top wall, both of these top walls being integrally joined to lower surface 108 of plate 102 in fluid sealing, substantially rigid relation.

Thus, gel bridge layer 114 is fixedly and enclosingly supported between walls or surfaces 108, 142, 152 and 154 and is integrally joined at its edges to the tops of gel blocks or legs 110 and 112, so as to form an integral gel unit 109 therewith.

Formed as a component of the test kit unit 100 plate 102 are generally horizontal extensions 156 and 158 each having a top surface 160 and a bottom surface 162. The top surfaces 160, 160 have positioned thereon at least one upstanding continuous, generally rectangular or oval wall or rib member 164, or plural, substantially parallel ribs 164 and 166.

Plate 102 may be formed from opaque material, as shown in FIG. 6, or from transparent material, as shown in FIG. 8, depending upon the particular tests for which the units are utilized and upon the particular method of examination with which the test kits are utilized.

In the preferred embodiments shown in FIGS. 5, 6 and 8 a series of generally oval passages or openings 170 are cut through the entire thickness of this plate member 102, these openings 170 overlying the upper wall 142 of the bridge member 140, bridge member 140 also having a lower wall 182.

Overlying the part 184 of plate 102 lying within ribs 164 and 166 and the passages 170 and substantially occupying the space between the ribs 164 and 166 is a peelable molding device, which is preferably formed of flexible rubber of plastic and serves also as a shipping and hermatic sealing cover member, indicated in its entirety at 190, and best shown in FIGS. 5, 7, 8, 12 and 14. This member 190, which is the only preferably flexible member of test kit unit 100, is also of generally horizontal form and may have the dimensions of its exterior side walls 192 and 194 preferably shorter and generally corresponding to those defined by the interior walls 196 and 198 of the rib surfaces, so as to frictionally fit, if desired, within the confines of the rib, or ribs. An extension 200 to one side serves as a handle for peeling or removing this element when the test unit is in use in the overall system, as explained more fully hereinafter.

Depending from the bottom wall 210 of this molding or cover element 190 are a series of longitudinally spaced, generally parallel projections 212, 212.

These projections are so dimensioned that they frictionally fit in fluid sealing relation within the corresponding passages 170, 170, firmly and preferably hermatically sealingly holding the molding and cover unit 190 attached to the plate unit 102.

Preferably, these projections 212, 212 have a thickness corresponding substantially to the thickness of the layer of horizontal plate unit 102, but, if desired, may be slightly thicker or thinner than plate 102.

Projecting generally downwardly and away from each projection 212 of the unit 190 are nipple elements 220 and 222, preferably two or more and integrally formed on each of the projection members 212.

Nipple elements 220 and 222 from rows of substantially parallel, integral gel well pairs, as best shown in FIGS. 5, 6, 9 and 19 through 21, the size of the individual wells, the spacing between paired wells and the spacing between the parallel well pairs being accurately defined by openings 170, projections 212 and nipples 220 and 222.

Figure 12:
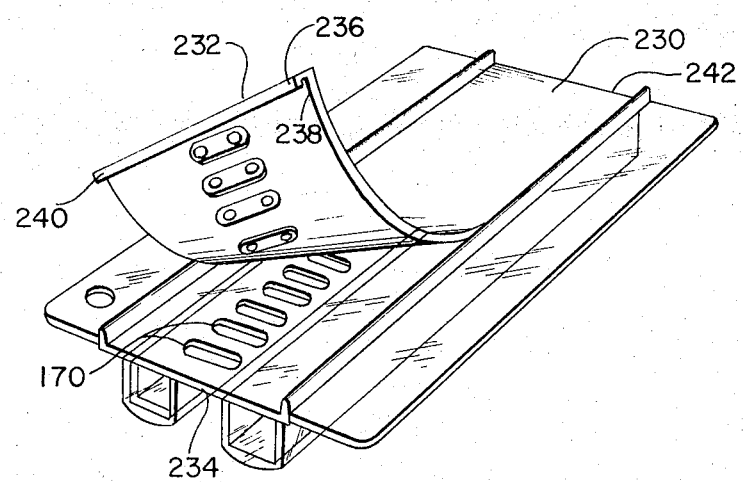
FIG. 12 is a perspective view of a second embodiment of the test kit unit of the invention showing a different embodiment of the well forming and sealing cover unit partially peeled away and of the bridge support.

Shown in FIG. 12 is an alternative cover element 230, which is formed of peelable material similar to that used in cover 190 and having similar projections 212 to frictionally, and preferably hermetically, fit into openings 170 in plate 102.

At least one end of this cover 230 has an end 232 extending beyond the end 234 wall of plate 102. Vertical wall 236 and horizontal wall 238 define a flexible channel 240 which fits over the end 234 of plate 102 to aid holding cover 190 in proper position. The other end, 242 of cover 230 may have formed thereon a similar channel for positioning purposes.

In the embodiments shown in FIGS. 5, 7, 11 and 12 these nipple elements 220 and 222 are substantially identical in size and are positioned, preferably, 0.6 centimeters apart from center to center, and each has a diameter of 3 millimeters. It will be understood that in the preferred embodiment, the nipple elements 220 and 222 do not extend completely downwardly to a position where they would be in contact with the top wall 142 of the bridge element 140, but terminate a short distance above the wall 142 leaving a very thin gel layer 244 beneath the nipples and between their lower walls and upper wall 142 to prevent open solvent contact with bridge 140.

In a preferred embodiment the thus continuously formed, gel bridge layer 250 beneath the nipples 220 and 222 and between them and the upper surface 142 of the plastic bridge wall is from five to seven thousandths of an inch.

Figure 14:
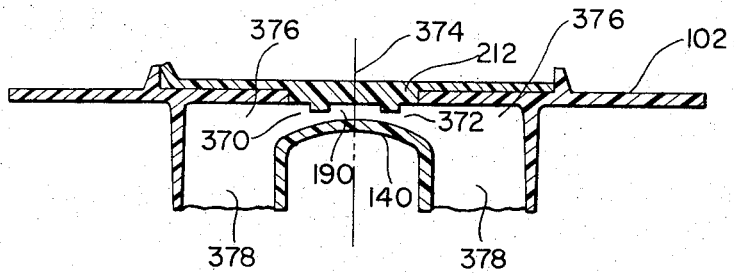
FIG. 14 is a vertical sectional view similar to FIG. 7 and showing a test unit having a different embodiment of the side-to-side bridge support configuration.

To form the test unit with the molded agar therein, the cover or molding element 190 and bridge 140 are fixed in position relative to the plate member 102, in a fluid sealing relation, as best shown in FIGS. 7 and 14. The entire unit is then inverted as shown in FIGS. 23A and 23B, so that the open ends 130 and 132 of th legs or troughs 128 and 129 are positioned pointing upwardly; see FIGS. 23A and 23B.

Properly selected liquid gel forming solution, or solutions, having the desired gellable components, is carefully poured into the assembled unit in a single operation or in timed sequential operations so as to completely fill the legs 128 and 129 and to overflow to form gel extensions 134 and 135 and to fill all of the space or cavity 270 left between the top wall 142 of bridge 140 and the end walls 152 and 154 of bridge 140 and the bottom wall 108 of the plate 102, and the remainder of such space as is unoccupied by the frictionally held projections 212 or by the nipple elements 220 and 222, so as to form the accurately spaced and sized wells 106, 106 in the gel bridge layer 114.

This pouring process is conducted in such a fashion as to make certain that no air or other gas is retained within the unit, so that the gel is interconnected in flush fit fashion with all of the interior walls of the unit, to prevent syneresis and to minimize electrical resistance.

There is thus formed an integral conducting gel path comprised of the agar or other gel legs 110 and 112 and interposed agar or other integrally formed gel bridge layer 114 with complete molded uniformity of all of the portions thereof, including the integral wells 106, 106 which are produced by the nipples 220 and 222 and the projections 212, 212.

The various gelled portions 250, 260, 262, 264 and 266 depicted in FIG. 23A may be a single homogenous, simultaneously poured gel. Alternatively the individual layers 250, etc., while formed of the same composition can be poured sequentially after each layer has partly gelled or set up. Each of the layers may have a slightly different composition. For example, an antibody or other reactive material may be part of the composition of the entire gel in homogenous fashion, or only the top or top layers 250 and 260 may have the reactive compoennt contained therein.

In the system described above and illustrated in the figures of the drawing it is seen that the thin gel bridge 114, including portion 250 and containing the wells 106, 106 therein is, after the cover member 190 has been removed, still supported on a substantially rigid structural base bridge 140 and is still confined by end walls 152 and 154 and by the lower surface 108 of the plate 102, with only the areas formerly occupied by projections 212, 212 being vulnerable to destructive forces. Thus, in contrast to prior art devices, wherein a thin gel layer is exposed in almost completely unsupported condition in both lateral dimensions and generally on a thin flexible base, the gel bridge of the invention has a non-removable protective enclosure substantially surrounding the same even after the wells of the gel bridge are uncovered.

Simultaneously, the above discussed minimum heat loss by thin gel usage is achieved, and the voltage and heat loss inherent with such prior art devices because of their requirement for separate wicks is eliminated.

It is pointed out and emphasized that any and all air bubbles which might be formed in this gel electrical path constitute electrical and solvent discontinuities. Such air bubbles hence, introduce undesirable variables which make uniformity of reproduction of the tests impossible, and they also sharply increase the electrical resistance of the test units, particularly in the critical area of the agar or other gel wells 106, 106.

After the gel has set in the fashion described with no air spaces contained within the gel legs 110 and 112 or in the gel bridge layer 114 or between the agar and the molding surfaces therefor, the open ends 130 and 132 of the legs or troughs 128 and 129 should be sealed unless the unit is to be used immediately. Such sealing should be done in such a fashion as to prevent the incorporation of air within the sealed test unit 100.

Figure 15:
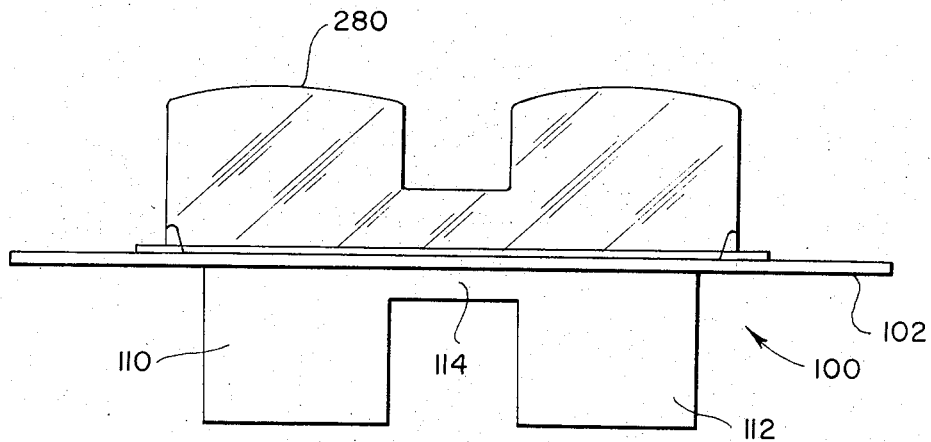
FIG. 15 is a vertical end view showing the sealing leg cover positioned during a test run as a well cover.
Figure 19:
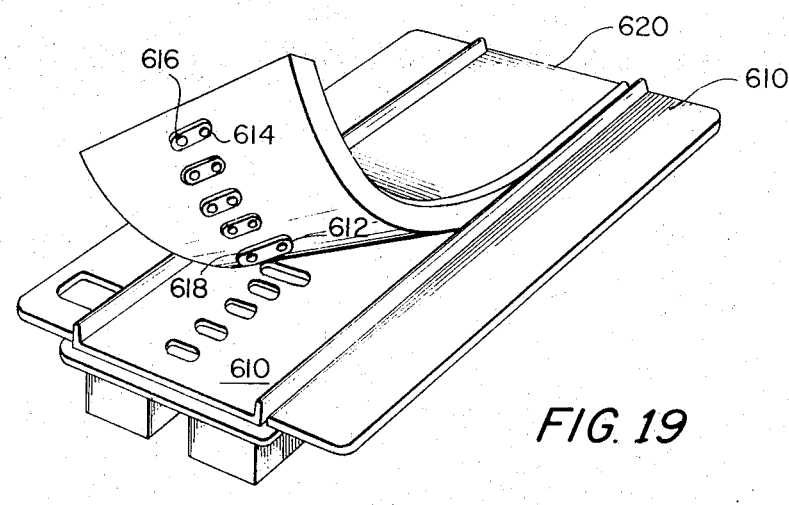
FIG. 19 is a perspective view similar to FIG. 5 of a different embodiment of the invention.
Figure 20:
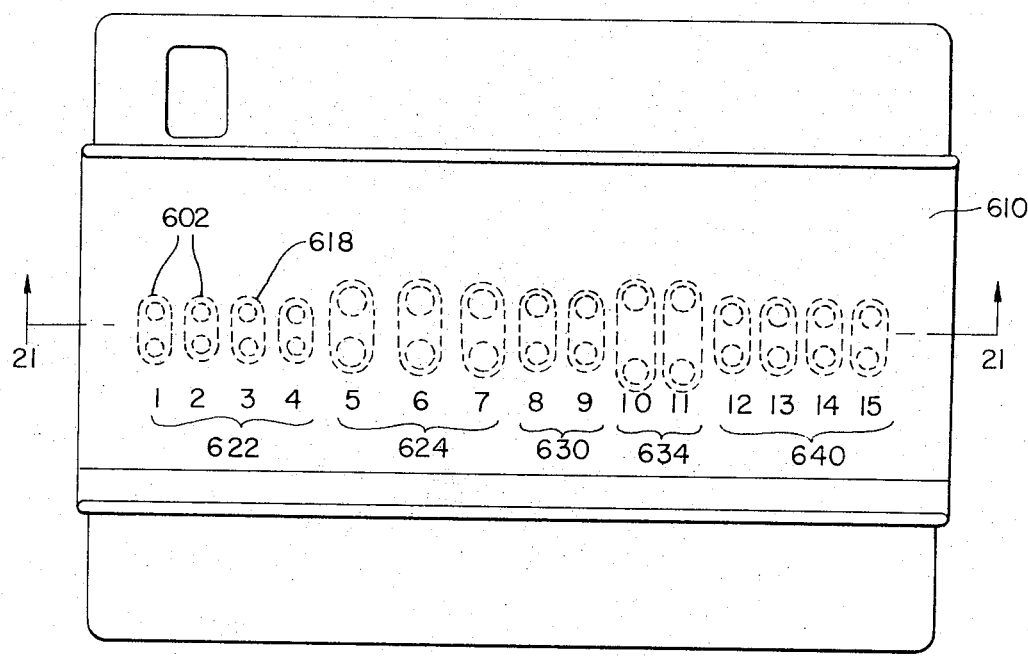
FIG. 20 is a top plan view similar to FIG. 6 and showing various alternative embodiments of the well parameters and shapes.
Figure 21:
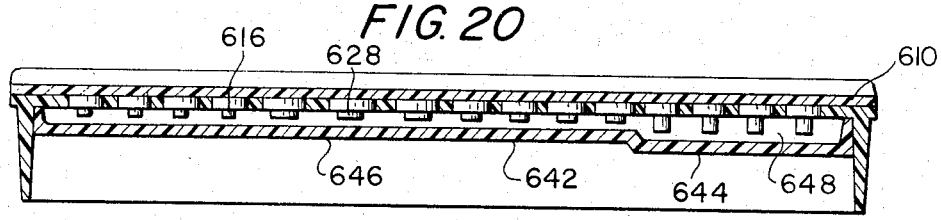
FIG. 21 is a sectional view taken on the line 21—21 of FIG. 20.
Figure 22A:
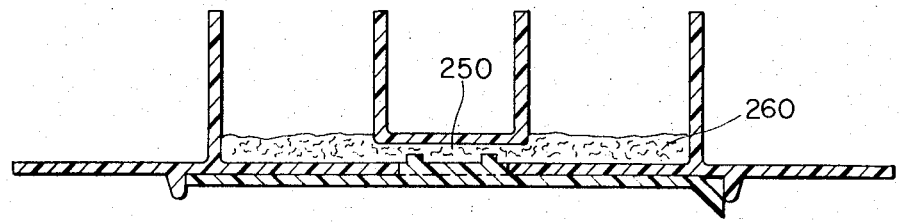
FIGS. 22A and 22B are vertical sectional views of a test unit positioned in position for pouring of the gel during the making of the gel bridge layer and integral gel legs.
Figure 22B:
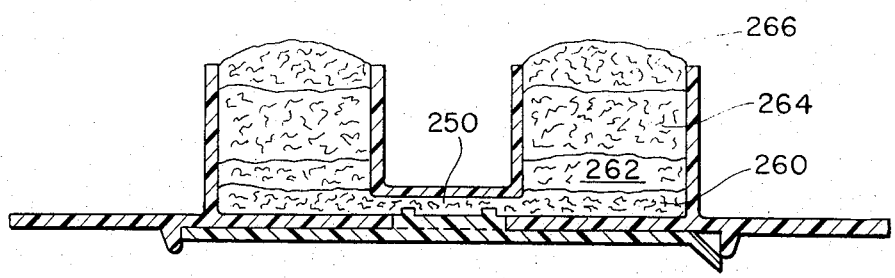

In the embodiment shown in FIGS. 7 and 15 a thin molded plastic cover unit 280 is preferably frictionally fit on the exterior vertical walls 120 and 122 and 124 of the legs 128 and 129. This cover unit 280 is preferably transparent and has generally convex surfaces 282 and 284 which are in contact with the convex bottoms 134 and 135 of the agar blocks or legs.

As shown in FIGS. 7 and 8 the cover unit 280 is stepped in width along its sides at 290 and 292 to allow nesting of the test kit units. The unit 280 should have the legs thereof sapced closely enough together, across gap 294 to prevent proper seating of the test kit unit 100 on the electrolyte tank dividing wall shelf 64 with the cover unit still in place; i.e., gap 294 is narrower than the width of shelf 64.

Figure 13:
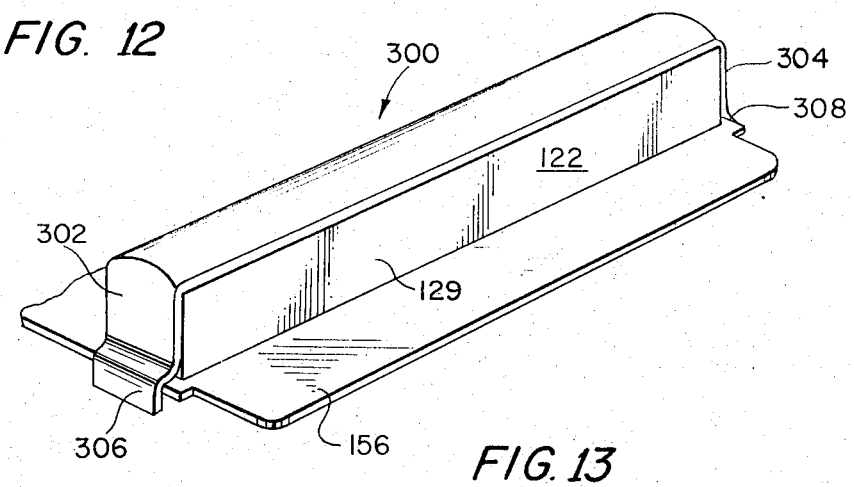
FIG. 13 is a perspective view of a portion of the test unit plate and bridge and of one leg showing an alternative leg sealing structure.

As an alternative to such a form of cover, a heat sealed sheet or a pressure sensitive sheet 300 of material, such as mylar, may be used as the hermetic protective cover for the openings 130 and 132 in the bottom of the legs 110 and 112 as shown in FIG. 13. If such a cover is utilized, it should be easily peelable if formed of mylar or the like and should have sealing extensions 302 and 304. The tape ends 302 and 304 preferably have extensions 306 and 308 which serve as pull tabs.

However, such hermetically sealing tape 300 may be formed of relatively greater thickness from a resinous material, for short shelf storage, which is soluble in the electrolyte when positioned therein. Among suitable soluble resinous materials are CMC (carboxymethylcellulose), hydroxyethylcellulose and polyehtyleneoxide. A preferred material is polyvinyl alcohol, since the degree of alcoholizing thereof can be varied during formation to determine the rate of solubility of the cover in the electrolyte.

The major importance of providing the air tight sealable cover member for the plate described above and the air tight sealing member or members for the bottoms of the legs is, as explained above, to prevent syneresis.

Syneresis is the exudation, or evaporation if there is exposure of a gel surface to a gaseous phase, of liquid from a gel into a contiguous space, which leads to contraction of the gel and to formation of a coagulated skin on the surface or surfaces thereof. Quite obviously, any such contraction of the gel will alter its dimensions and properties and, hence, impair the uniformity of reproduceability and the reliability of tests performed therewith.

Additionally, the formation of a coagulated skin occurring at the well sites per se has been a recurrent and virtually insoluble problem of the prior art devices, since such a skin completely alters the rate of flow through the gel of materials such as specimens which are positioned within the wells 106, 106, where the walls of such wells have such a skin formed thereon by syneresis.

Accordingly, the prior art devices have had exceedingly short shelf life, and the percentage of reproduceability has been low even with short shelf life.

With the embodiments thus far described in detail the preferred method of operation is as follows.

Figure 9:
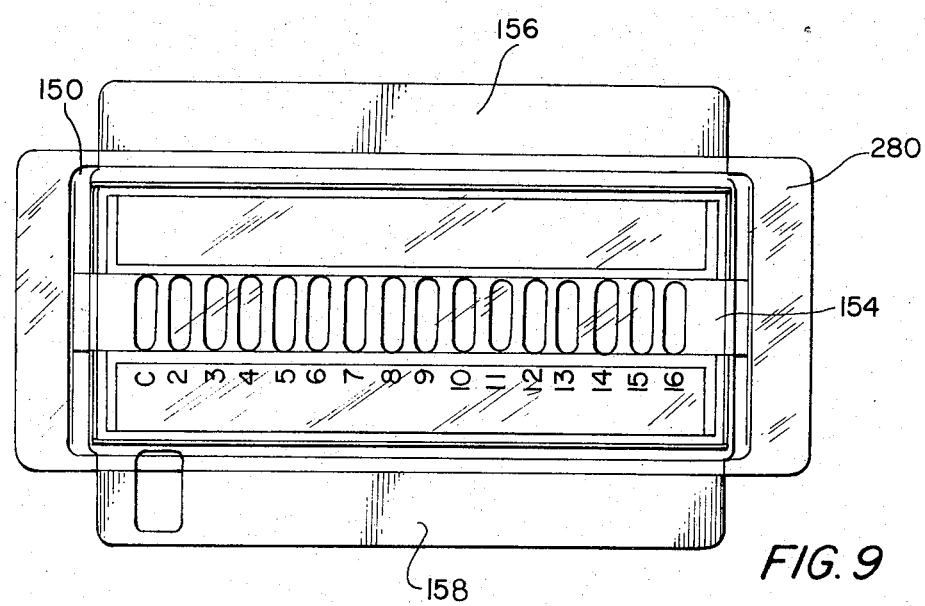
FIG. 9 is a bottom plan view.

The sealable cover unit 190 or 230 is removed from the plate unit, exposing the wells. As best shown in FIGS. 6 and 9, the wells 106 and openings 170 have numbers 310 positioned therealong, one numeral beside each set of wells, so that they may be readily identified. Additionally, it is preferred that one of the edge extensions 156 and 158 of plate 102, such as edge 158 be formed of a roughened material, so that the technician or research worker may easily write thereon. Additionally, well pair identifying lines 316 are preferably formed on plate 102.

Each well 106 generally has an indentical well 106 paired therewith to form a well pair 320. Generally, as shown, there is a control pair 322 of wells at one end of the test unit in order to provide the user with a simple and accurate means of determining that the unit is functioning properly and to demonstrate the preferred reaction and precipitin line, indicated at 330, between the components of the wells.

The bottom cover member 280 or 300 is stripped off of the bottom ends 130 and 132 of the leg members 128 and 129, if a plastic, non-soluble cover or friction fit leg cover has been used.

The test unit is then placed astride the electrolyte dividing wall shelf 64 on the tops 90, 92 of the side walls 35 and 36, as shown in FIGS. 1 and 3, and, if desired, on the tops of the end walls 26, 28 with the locating notch 104 in the proper position relative to element 94. The timer and voltage control units 13 are properly set and the necessary electrical connections and adjustments are made to provide the desired electrical field and field gradient across the gel bridge 114, as explained above.

In actual practice, it has been found that optimum electrophoresis of Serum Hepatitis $Ag$ and $Ab$ occur with a voltage gradient between the wells 106, 106 of approximately 6 volts per centimeter. With the system described thus far, including wells spaced approximately 0.6 centimeters apart, the minimum potential which can provide such a voltage gradient is about 15 volts. The system, as explained above, can provide up to 30 volts maximum, so that an excess over the required initial 15 votls available, as needed, to compensate for polorization of the electrodes and of the electrolyte in the electrolytic tanks. The constant current regulating device described above as connected in series with the 30 volt power supply and the electrolyte tanks and the gel path, functions to maintain the desired 6 volt per centimeter gradient between the well sites of the total voltage drop across the entire gel unit including legs 110 and 112 and continuous relatively thin bridge 114 containing wells 106, the large majority thereof, i.e., the ohmic resistance thereof occurs within bridge portion 114.

Preferably about ninety per cent of the total voltage drop in the test unit kit, or about 13.5 volts occurs from edge to edge of the bridge layer, providing the desired 6 volt per centimeter relatively high voltage gradient at the vicinity of the test well sites; only about 5 per cent of the total test unit voltage drop, or 0.75 volts, occurs in each leg 110 or 112.

This is in sharp contrast to the prior art devices wherein most of the voltage drop and ohmic resistance occurs in the wicks or in the wick to gel film interfaces or in the gel block to gel film interfaces or in the gel film portions remote from the wells and required for effective contact with the electrolyte solution, or in skin formed on the gel. All of these prior art device voltage losses occur at points in the test unit where they serve no useful purpose but, in fact, have a deleterious effect.

It will be appreciated that this system is, therefore, operable at a much lower overall voltage than the systems of the prior art, such prior art systems operating at about at least 100 volts and generally at about 200 to about 300 volts. Hence, the danger of electrical shock to the operator is lessened to such a degree as to be virtually negligible. As shown in FIGS. 2 and 3, when the test unit is positioned on top of the walls of the electrolyte tank compartments, straddling the top wall 64 of the shield 62, with one leg immersed in the anode compartment and the other leg immersed in the cathode compartment, there is formed a closed electrical circuit through the power supply, the electrodes, the electrolyte tanks, the agar or other gel blocks and the preferably integral agar or other gel bridge. Furthermore, the length and width of the plate member 102 is such that no spaces are available between its ends, such as 150 and 154, and electrolyte tank walls 26 and 38 for inexperienced personnel to insert their fingers into the electrolyte solution while the test run is being conducted.

The supply unit 10, which is provided with the outlets 14, 14' to which the test units are connected is provided preferably, with a voltmeter or ammeter, indicated at 340, which is selectively connectable to each of the outlets 14 by means not shown, and hence, to each of the electrolyte tanks and current supply units therefor, so that the current in each unit can be monitored.

Thus far, there has been described a test kit unit which is expendable, so that after each use, the entire test kit is discarded and the electrolyte compartments are emptied and flushed and filled with fresh electrolyte before a new test is run. Such equipment is tailored for the relatively inexperienced technician for whom it is desirable to minimize possible infectious contact.

With more experienced research workers, however, the same basic equipment can be made of sturdier construction and, in some instances, of different materials having a greater strength, less sensitivity to corrosion, etc. In such a case, the test unit components are capable of being autoclaved or otherwise hygienically sterilized between uses. In such a case, the same test kit unit can be used over and over, the unit, of course, being cleansed and thereafter being simply filled with fresh agar gel or the like for each successive use.

There are a large number of variables which determine the voltage gradient described above and these include the gel support, the gel thickness, the well area, the length of the path between the wells and the particular electrolytes and buffers and their strengths. However, in order to produce constant reliable and uniformly reproduceable results, it is only essential that these variables be fixed, as is accomplished by the present invention.

While a uniplanar bridge may be used, as described above, a sinuous bridge 350, having alternate sinusoidal curved portions shown at 352 and 354, in FIG. 10 may be used, or, a stepped bridge 360, having alternate stepped portions such as those shown at 362 and 364 may be used, (FIG. 11) to form gel bridge layers having the shapes and thickness variations shown in FIGS. 10 and 11.

In FIG. 14, there is shown an alternative cross-sectional form of the support bridge 140 underlying the test wells. As shown the plastic bridge 140 is curved thereacross, so that at the points 370 and 372 which are located in the gel bridge layer 190 at positions most remote from the portions of the gel layer located between mating wells, such gel layer is thickest. Hence, at these points the gel layer has the least ohmic resistance and the lowest voltage gradient. From each of these points to the center, indicated at 374, the thickness of the gel layer decreases, thus producing the highest voltage gradient per unit of distance at the center between each pair of mating wells. This configuration permits for all of the possible test variables being fixed except for varying the gel thickness. The structure minimumizes heat building between the wells, since the resistance of the gel bridge is always minimized.

In order to prevent contamination of the wells and accidental infection of the technician during the test run, it is desirable that the wells be covered to prevent the accidental deposition therein of foreign materials after the desired materials have been positioend within the wells by pipette or similar means.

Where the friction fit cover 280 is used for covering the bottom of the legs, this plate also may be used as the cover for the wells after it is removed from the bottom of the legs, as shown in FIG. 15. Alternatively, the wells may be covered by sealable strips of mylar or similar material, or may be covered simply by the positioning thereover of a flat plate or appropriate dimensions, which plate is preferably transparent.

While the plate 102 is described thus far as preferably opaque, it is apparent, as explained above, that the plate could be formed of transparent materials. Whether the test kit plate is transparent or opaque, the well numerals are desirably positioned on both sides thereof, so that the wells can be more easily identified, regardless of the position of the test kit unit.

This is particularly important in the viewing of the test kit units after the runs have been made, so as to enable better, more accurate determination of the test run results.

Figure 16:
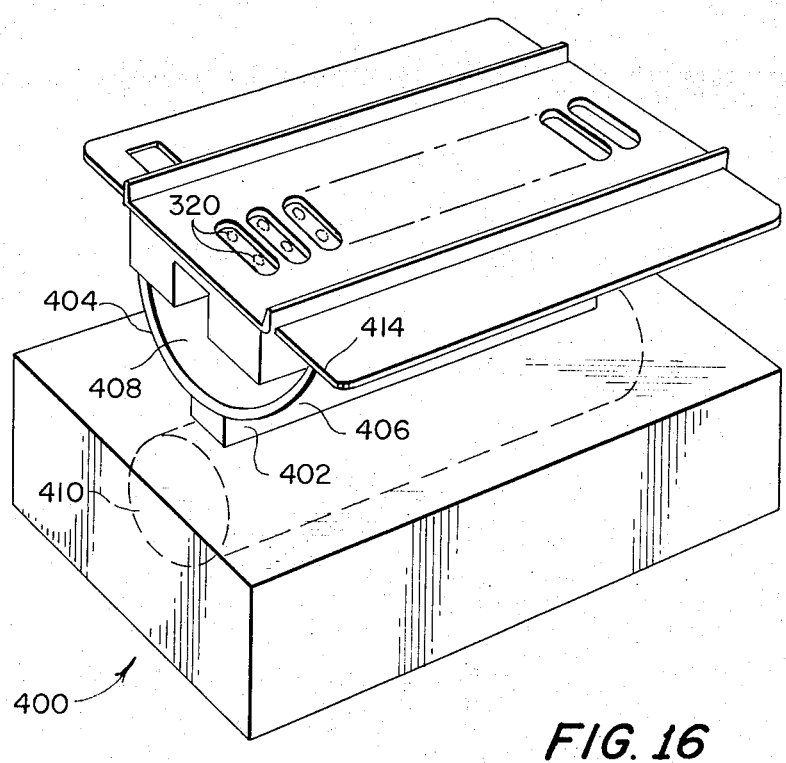
FIG. 16 is a perspective view showing the test kit unit after a test run in position on a preferred form of viewing device for observing the test results.

In general, for ease of observation of the test run results, the test kit units, after the tests are run, are illuminated by what is generally termed dark field illumination. A means for such dark field illumination observation is shown in FIG. 16. In this FIG., a viewer, designated in its entirety as 400, has a supporting leg member 402 and curved legs 404 and 406 which may be light conducting members, in which case they are coated on the interior 408 thereof with an opaque material layer. A source of light 410 is positioned beneath the viewer, and light therefrom is conducted up so as to illuminate the test well areas of the test plate unit against the dark background, when the edge extensions 156 and 158 of the plate are supported on the edges 414, 414 of the viewer, plastic bridge 140 being transparent.

It will be understood that the present invention can be utilized for systems other than those such as the above described hepatitis tests, wherein substantially uniform wells with substantially uniform test specimens therein are utilized.

Figure 17:
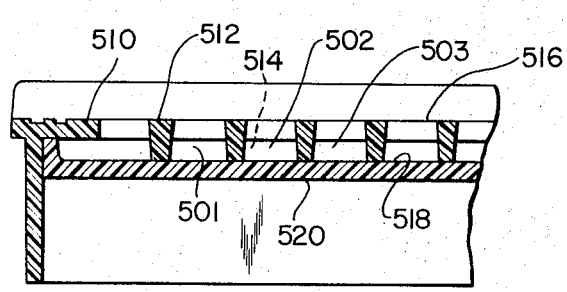
FIG. 17 is a partial sectional view of a first alternative embodiment of the plate and bridge support members.
Figure 18:
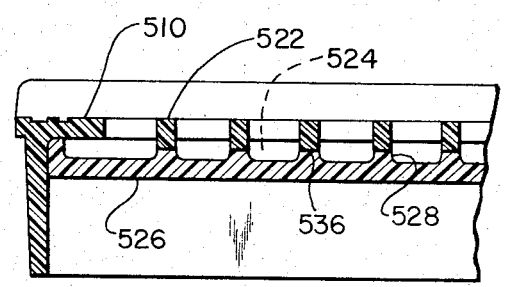
FIG. 18 is a view similar to FIG. 17 showing a second alternative embodiment thereof.

As illustrative of such an additional test for which the system of the invention is suitable, there is described and illustrated, see FIGS. 17 and 18, a system in which the wells along one side of the bridge are filled with uniform samples of fluid such as blood serum from a selected patient.

In this case, it is desired to test the patient's serum for a variety of diseases or contaminants. Hence, the opposing well of each of the well pairs are filled with different materials; i.e., the material in opposing well 501 differs from that contained in opposiing well 502, which in turn differs from that contained in opposing well 503, etc.

In such a system, if accurate results are to be obtained, it is essential that the individual matched or paired sets of wells be isolated from each other. This is accomplished by the structures in FIGS. 17 and 18. In FIG. 17, the plate member 510 has walls 512 and 514 vertically and downwardly extending around each opening 516 therein, which walls are of sufficient length so that they contact the upper surface 518 of the bridge 520 and, hence, isolate each set of wells. Alternatively, as shown in FIG. 18, the plate 510 may be formed with similar depending walls or ribs 522 and 524 and the bridge 526 may be formed with complementary upwardly extending ribs or walls 528 and 530 which meet the downwardly extending walls 522 and 524 of the plate in sealing relation. To better insure sealing of such walls, they may be formed of flexible material, or may be coated with a sealant material 532 at the extremities 534 and 536 thereof.

Depending upon the particular test and test materials, the volume, spacing, depth and width of the wells may be varied. This may be done by the structures shown in FIGS. 19, 20 and 21 in which the openings or passages 602, 602 in the plate 610 have been varied, and the sizes of the projections 612 and 614 and of the nipple members 616 and 618 of the sealable cover 620 have been varied. In the embodiments shown, well pairs 622, numbered 1-4 are similar to those described above, except that the diameters of the wells vary.

Well pairs 5, 6 and 7, number 624, have openings for forming the same which have greater width and greater length. It will be noted that the projections 628 for forming the wells are shorter, but broader, then those for well pairs 622, so that the wells formed thereby are more shallow, although having greater diameter.

Well pairs 8 and 9, numbered 630, have shallow depths as do well pairs 624, but are slightly smaller in diameter.

Well pairs 10 and 11, numbered 634, have the wells thereof spaced a greater distance apart by the location of the forming nipples 636 therefor. Well pairs 12 through 15, designated as 640, have greater depth than any of the previous wells and, for this purpose, bridge support member 642 may have a section 644 which is vertically positioned a greater distance from plate 610 than bridge portion 646, forming a larger gel cavity 648.

There is a further form of test which is desirable and is commonly used in blood or other similar sera research. Such a test is generally designated as serial dilution, which test is most useful for determining the concentration of a specific organism or specific organisms in the sera. To conduct such a test, the apparatus shown in FIG. 23 may be provided for the test kit unit. It will be seen that the bridge member 650 has its upper surface 652 canted from the left side 654 to the right side 656, as viewed in cross-section. This provides a uniformly changing voltage gradient relatively from one thin end 670 of the plate or test kit gel layer 672 to the other relatively thick end 674 thereof. The thickness of the gel bridge layer increases substantially uniformly along the longitudinal axis from one end 670 to the other end 674, except, naturally, for the exceptions of the specific positions where the wells are formed therein. In like manner it should be understood that the thickness of the gel bridge layer referred to throughout the specification is intended to mean the overall thickness discussed with the exception of the specific thicknesses at the well sites. Since there is an optimum A$b$–A$g$ concentration required for predipitant formation, the migration of the diluted antigen positioned, for example, in the wells formed in the left end of the gel layer would travel at the same rate as the more concentrated antigen positioned in the wells formed at the right end of the plate, so that the precipiten line for each well pair will be formed at approximately the same, substantially centered positions between the wells of each pair.

In addition to the paired well-to-well test between antigen and antibody described above, there is a widely used electrophoretic test method which is commonly called zonal immunoelectrophoresis and for the performance of which the present invention is suitable. A preferred embodiment of the invention adapted for this form of test is illustrated in FIGS. 24, 25 and 26.

In such a test kit unit 700 a single well 702 with an initial friction fit, preferably hermetically sealed cover 704 generally coacting as previously described with the plate member 710 is formed in the agar or other gel bridge layer 702. A body fluid containing a complex or variety of proteins and/or other components is placed in this well 712 after removal of the cover 704. The gel or agar layer, as with the agar or other gel layers described above, contains an appropriate buffered solvent. The several components of the mixture of fluid which is placed in the gel well 702 are separated electrophoretically by passing direct current through the gel layer as described hereinafter. Plate 710 has an opening 714 for a well forming nipple 716 on projection 718 of peelable cover 704.

Figure 24:
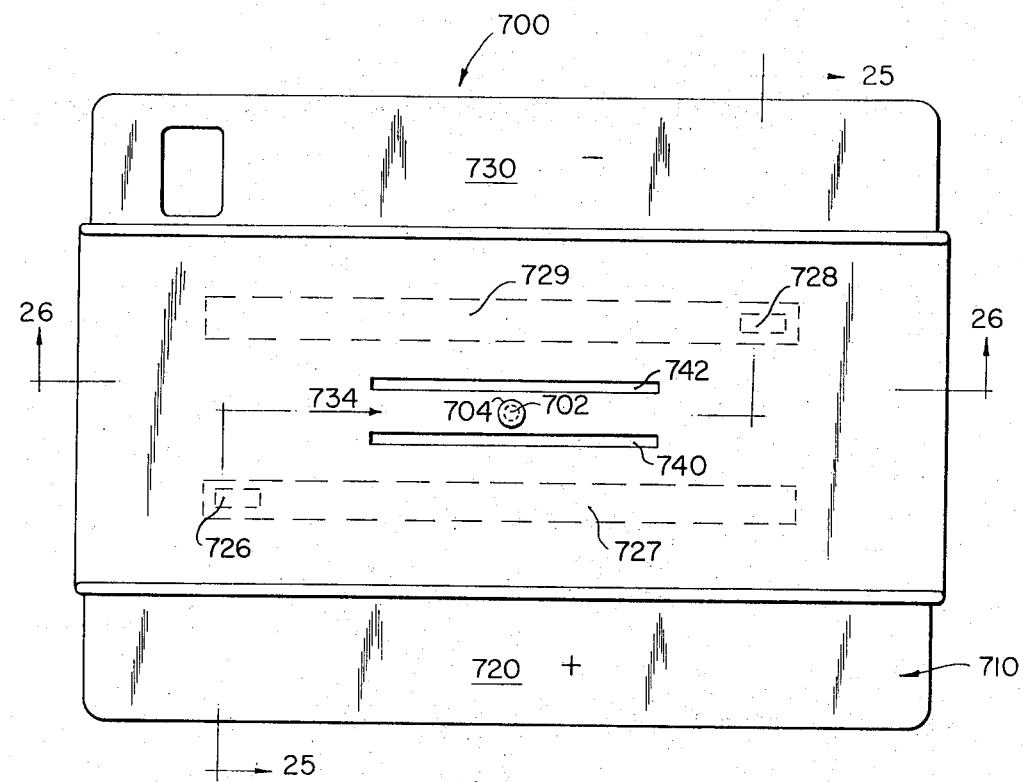
FIG. 24 is a plan view of an alternative embodiment of a test kit unit of the invention preferred for zonal electrophoresis.
Figure 25:
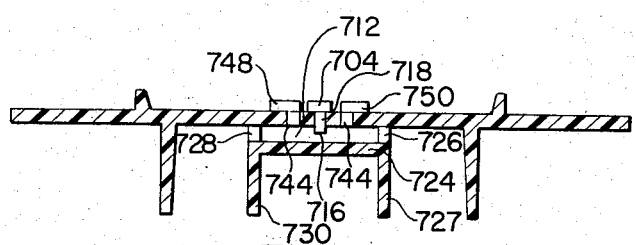
FIG. 25 is a sectional view taken on the line 25—25 of FIG. 25.
Figure 26:
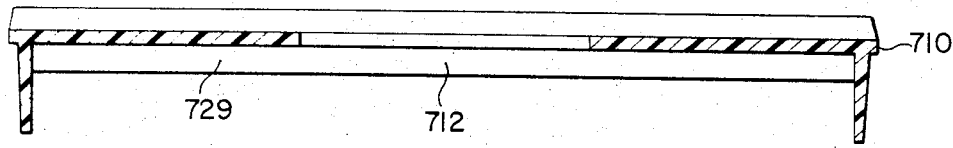
FIG. 26 is a partial sectional view taken on the line 26—26 of FIG. 24.

On the anodic side 720 of the test kit unit 700 the only opening in the side wall 727 of plastic bridge unit 724 is shown in FIGS. 25 and 26 at 726, so that as viewed in FIG. 24, the electrical connection from this side 720 to the gel bridge layer 712 is made only at the left end of the unit. In like fashion, the only opening in the other side 730 of the supporting bridge unit 724 other side wall is shown in FIGS. 24 and 25 at 728, so that as viewed in FIG. 24 the electrical connection of opposite polarity to the gel bridge layer 712 is made only at the right end of the unit. The current flow is thus directed as indicated by arrow 734, along the major axis of the plate member 710 and the fluid components are zonally diffused from within the single well through the gel bridge layer according to their size, concentration, etc., as explained and shown in the above referred to Williams et al. text at pages 250 through 262.

Also cut initially through the plate 710 and into the gel layer 712 are longitudinally extending slots 740 and 742 whose axes generally parallel the axis of the electrical flow path, and these slots 740 and 742 are initially filled with projections 744 and, if desired, well or slot forming nipples of sealing cover members 748 and 750. After the above described electrophoretic run for differentiating the fluid has been completed, these cover members 748 and 750 are removed.

Formed wells or slots 740 and 742 are then filled with an antisera which is capable of reaction with the biological fractions which have been longitudinally diffused along the gel layer 712 in all directions from the well 704. The antisera in each of these slots diffuses through layer 712, and, as a result of such diffusion, the A$b$ reacts with the separated components of the body fluid to produce a series of precipitant lines, generally arcuate, whose position, quantity, and quality can be used as a zonal means for determining the composition of the fluid mixture. As shown in Williams et al., a central slot with wells on each side in the gel may be used alternatively.

From the foregoing description, it is obvious that the present invention has eliminated the instability and highly increased resistance caused by the prior art wick materials, which have been utilized to lead the electrical current and the electrolyte from the electrode compartments to the gel bridge. While many of the prior art devices have suggested an inverted gel layer laid upon agar or other gel blocks as a means for overcoming this deficiency, such prior art devices have not been satisfactory in actual usage. This is because there is, in fact, no complete and uniform electrical or liquid path through such structures. Instead, during the process of formation of the blocks and layer, by syneresis and oxidation, there are formed skin members on both the bridge and the blocks and there are formed a multiplicity of spaced points where the blocks and layer meet. These points, since they have a high resitivity, cause intensified heat, which in geometric progression, causes increased resitivity, causing greater heat, etc. Hence, the voltage gradient is greatest, not in the areas of the gel layer between the wells, as desired, but in useless areas outside thereof. Additionally, while to the naked eye such block-to-layer boundaries are complementary and are flush fit, in actual fact, they consist, as stated, of a continuous heterogeneous complex of points and discontinuities for the agar and solution and they provide discontinuous, undesirable air bubble sites which cause syneresis in addition to the above described increased resistance.

As illustrative of such prior art systems there may be mentioned those shown and described in Arquembourg U.S. Pat. No. 3,498,846, British Pat. No. 992,845, Williams et al. *Methods in Immunology and Immunochemistry*, Academic Press (1971) Volume III, pages 240–245. *An Improved Technique of Agar-Gel Electrophoresis on Microscopic Slides* by R. J. Wieme, *Clinica Chima Acta*, Vol 4 (1959), pages 317–321, *The Antibiotics of Escherichia Cola* by Ludford et al., *Australian Journal of Experimental Biology* Vol. 31, pages 553–560 (1953) and *Agar Gel Electrophoresis* by R. J. Wieme, Elsevier Publishers, pages 36, 37, 43 and 70–77 (1965).

Even if the agar or the like gel blocks and the agar or like gel bridge are cast or molded simultaneously, adequate shelf storage thereof will be impossible for practical commercial usage unless the test kit units are completely gel filled and hermetically sealed to prevent syneresis, as described herein.

Additionally, it is emphasized that even where the gel legs and bridge are cast simultaneously, such as in the system shown and described by Nanto et al. in *The Journal of the American Leather Chemists Association*, Volume LX, No. 2, February 1965, pages 63–71, entitled *Optimal Conditions in the Starch-Gel Electrophoresis of Heat-Denatured Collagen*, the objects of the present invention are not capable of being achieved, because in contrast to the Nanto et al. teaching, the agar or other gel layer wells per se must be integrally cast simultaneously with the gel legs and gel bridge and must be covered during and immediately after the molding thereof. Otherwise, syneresis will inevitably occur. Furthermore, in such prior art systems the wells must be subsequently formed by cutting tools which are not capable of precision placement, as are the wells formed by the present invention. Such cutters inevitably disturb the gelled material to produce non-uniform discontinuities within the gel layer; the more gel skin formation prior to cutting, the greater will be the test well non-uniformities.

Prior art devices are also known, such as Elevitch U.S. Pat. No. 3,479,265 and 3,635,808, in which the specimen wells are formed simultaneously with the formation of a gel layer containing the wells. However, such devices are totally devoid of any elements equivalent to or serving the function of the integrally formed gel legs of the structures of the embodiments of the present invention, which function to positively conduct electrolyte uniformly and easily to the opposite sides of the thin gel bridge layer and to the wells contained therein.

Instead, such systems must be used, as stated in the above patents, with the above discussed, separate wick elements, so that these systems inherently require high voltage supplies and consequent high voltage gradients throughout with the above discussed, attendant disadvantages of such high voltage systems, including the lack of uniform contact between layer and wicks, causing increased resistivity, non-uniform electrolyte freed nonuniform tests, etc.

Furthermore, such systems require the removal of a cover element from all of an entire side of the gel bridge layer, necessitating an extreme delicacy in operation of removal which cannot be attained by inexperienced personnel. Stated in a different fashion, such prior art devices do not provide a complete test unit, including integral protected components such as the gel legs described herein, for immersion within electrolyte tanks to conduct an electrophoretic test, but instead leave a thin, flexible, plastic film which is unsupported and unprotected.

It should also be pointed out that many of the common contaminants of viral or bacteriological form are present in most atmospheres, including those of laboratories. Hence, a test unit will become contaminated therefrom unless it is sealed as described herein; thus, it is seen that the herein described sealing structure and system simultaneously prevent pollution and syneresis, inherently increasing the shelf storage of the discussed test kit units, and decreasing possible contamination thereof.

The structures of this invention also serve to prevent mixing of the initial buffer solution with buffer solution of changed composition due to electrolysis at the electrodes, since the agar or other gel legs and bridge of the test kits disclosed and claimed herein are devoid of air passages through which such mixing can readily occur. Also, by the use of relatively large and integral gel blocks and bridge and of precision formed and sealed wells, the net loss of fluid which occurs at the cathode side of the bridges of the prior art devices due to endosmosis is prevented.

Figure 23:
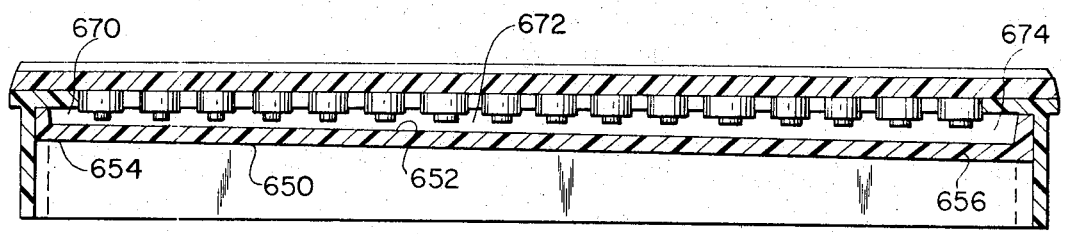
FIG. 23 is longitudinal sectional view of the bridge and support showing a different embodiment thereof.

In a further embodiment of the invention where expense of the test kit units is to be minimized, see FIG. 14, the gel bridge layer 374 and the very tops of the gel legs 110 and 112 indicated at 376, 376 in FIG. 14 or layers 250 and 260 of FIG. 23 are composed of very pure agar or other gel, while the remaining portions 378, 378 of the gel legs 110 and 112 are formed of a less pure gel, such as inexpensive impure agar, whose cost may be as little at 10 percent of the cost of purified agar. Therefore, the test units will still be pure and retain their desirable features at the test well sites, where the test reactions occur, but the overall cost of each unit can be substantially decreased.

It will be seen from the foregoing description of the preferred alternative embodiments of the test kit unit structures, that they are comprised of (a) an assembly of performed elements, including the legs, bridge, plate and peelable cover, whose inner surfaces which contact the gel form the sole and final molding surface means for all of the gel including the legs, bridge and well portions thereof, and (b) a substantially integral gel portion whose components include block legs and a relatively thin bridge containing wells of precise configuration and positioning within this bridge.

These preformed components and the gel portions contained therein are, as described, produced in a form in which they may be shipped without any substantial alteration to the ultimate user, so that the only steps required by the ultimate user are the simple removal of the preformed cover portions and use of the remainder of the test kit units, with the thin gel layer substantially rigidly enclosed and supported, as described.

What is claimed is:

1. An electrophoretic test kit unit, comprising, in combination,
    an integrally formed gel unit of low ohmic resistance,
    said integral unit having two relatively thick, generally parallel gel legs having positioned therebetween an integral gel bridge layer,
    said gel bridge layer being thin relative to said gel legs,
    a row of spaced well pairs formed integrally in said gel bridge layer,
    a substantially rigid molding and supporting means for said gel unit,
    said molding and supporting means including nonremovable means for enclosing substantially all of said gel bridge layer except for a row of openings substantially overlying and coextensive with said well pairs and the areas of said gel bridge layer between each well of each pair,
    said molding and supporting means further enclosing substantially all of said gel legs except the bottom thereof,
    said supporting means further including cover means for retaining said gel bridge layer in substantially immobile position relative to said gel legs,
    said cover means having projections positioned within each of said openings whereby said well pairs are exposed when said cover means is removed.

2. The combination of claim 1 wherein the large majority of said low ohmic resistance is formed by said gel bridge layer.

3. The combination of claim 1 wherein about ninety per cent of said low ohmic resistance is caused by said gel bridge layer.

4. The combination of claim 1 wherein each of said gel legs provides about 5 per cent of said low ohmic resistance.

5. The combination of claim 1 wherein said gel unit provides the only electrically conductive path through said test kit unit.

6. The combination of claim 1 wherein said gel unit has homogenously incorporated therein a reactive test material.

7. The combination of claim 1 wherein said gel bridge layer is formed from a gel having higher purity than the gel from which the said gel legs are formed.

8. The combination of claim 1 wherein said wells have a depth substantially equal to but less than the thickness of said gel bridge layer, forming a very thin gel layer having a thickness of between about five and about seven one-thousandths of an inch beneath each of said wells.

9. The combination of claim 1 wherein said gel bridge layer has a longitudinal axis and has a thickness which varies in a direction substantially perpendicular to said axis.

10. The combination of claim 9 wherein said varying gel bridge layer thickness is greatest adjacent said gel legs and least at the center of said layer in said direction.

11. The combination of claim 9 wherein said thickness varies in a symmetrical curve.

12. The combination of claim 1 wherein said gel bridge layer has a longitudinal axis and has a uniform thickness along said axis except where said wells are formed therein.

13. The combination of claim 1 wherein said gel bridge layer has a longitudinal axis having opposite ends and said layer has a greater thickness at one end than at the opposite end.

14. The combination of claim 13 wherein said thickness increases substantially uniformly along said axis from said one end to said opposite end except where said wells are formed therein.

15. The combination of claim 1 wherein said plurality of wells comprises a plurality of well pairs spaced along a longitudinal axis of said gel bridge layer.

16. The combination of claim 15 wherein all of said well pairs are spaced equidistantly from each other.

17. The combination of claim 15 wherein all of said wells of all of said well pairs have substantially identical parameters.

18. The combination of claim 1 wherein said gel bridge layer has a longitudinal axis and the thickness of said layer varies sinusoidally along said axis.

19. The combination of claim 18 wherein said wells are located in the areas of greatest thickness of said sinusoidally varying thickness.

20. The combination of claim 1 wherein said gel bridge layer has a longitudinal axis and the thickness of said layer along said axis is alternately thicker or thinner in alternately stepped fashion.

21. The combination of claim 15 wherein said spaced wells have differing diameters.

22. The combination of claim 15 wherein said spaced wells have differing depths.

23. The combination of claim 15 wherein said spaced wells have different depths, different diameters and different center-to-center spacing.

24. The combination of claim 1 wherein said supporting means includes a plate member extending generally horizontally and perpendicular to said gel legs, said plate member having an upper surface and a lower surface.

25. The combination of claim 24 wherein said plate has openings therein extending therethrough.

26. The combination of claim 24 wherein said plate member is opaque.

27. The combination of claim 24 wherein said plate member has axis extending above said gel bridge layer and has openings spaced therealong.

28. The combination of claim 25 wherein a separate one of said openings is positioned above each of said plurality of wells.

29. The combination of claim 24 wherein a plurality of spaced, parallel ribs extend upwardly from said upper surface.

30. The combination of claim 24 wherein a peelable cover is supported by and positioned over said plate.

31. The combination of claim 30 wherein said cover is flexible.

32. The combination of claim 30 wherein said cover has positioned thereon a handle extension.

33. The combination of claim 30 wherein said cover is positioned between said ribs.

34. The combination of claim 30 wherein said cover is frictionally supported by said plate.

35. The combination of claim 33 wherein said cover has projections complementary to and frictionally fitting within said openings in hermetically sealing relation.

36. The combination of claim 33 wherein said cover has projections complementary to and frictionally fitting within said openings in hermetically sealing relation.

37. The combination of claim 35 wherein said plate and said projections have substantially equal thickness.

38. The combination of claim 35 wherein each of said projections has at least one separate nipple extending downwardly therefrom into said gel bridge layer.

39. The combination of claim 35 wherein each of said projections has a pair of spaced nipples extending downwardly therefrom into said gel bridge layer.

40. The combination of claim 36 wherein each of said projections has a pair of spaced nipples extending downwardly into said gel bridge layer and each of said nipples has substantially equal parameters.

41. The combination of claim 39 wherein each of said nipples extends downwardly a distance less than the thickness of said gel bridge layer but substantially equal thereto.

42. The combination of claim 27 wherein the said plate member is substantially rigid and has edge extensions on each side of said openings.

43. The combination of claim 42 wherein at least one of said extensions has a position orientational means formed thereon.

44. The combination of claim 42 wherein at least one of said extensions has spaced identifying lines positioned on the upper surface thereof.

45. The combination of claim 27 wherein said plate member has a separate identifying means molded thereon adjacent each of said openings.

46. The combination of claim 24 wherein said plate has substantially rigidly connected thereto, and extending vertically downwardly therefrom, a plurality of connected gel leg molding walls.

47. The combination of claim 46 wherein said walls are joined in fluid proof relation.

48. The combination of claim 46 and including overlapping end walls.

49. The combination of claim 46 wherein the exterior of said molding walls and said plate are integral.

50. The combination of claim 1 wherein each of said gel legs has a convex bottom surface.

51. The combination of claim 46 wherein each of said gel legs has convex bottom portions extending beyond the said gel leg molding walls ends.

52. The combination of claim 51 wherein a cover unit is frictionally positioned over said gel leg bottom portions.

53. The combination of claim 52 wherein said cover unit has a separate trough hermatically sealed over the exterior of the walls of each of said gel leg molding walls.

54. The combination of claim 53 wherein a plurality of said test kit units are placed in nestedly stacked relationship.

55. The combination of claim 51 wherein a peelable sealing tape is positioned over said bottom portions in hermetically sealing relation.

56. The combination of claim 55 wherein each of said tapes has a pull tab extension on one end thereof.

57. The combination of claim 46 wherein a substantially rigid plastic bridge is positioned between said leg molding walls and hermetically sealed thereto.

58. The combination of claim 57 wherein a separate end wall is positioned vertically extending upwardly from said plastic bridge, each of said end walls functioning as a spacing member between said plastic bridge and the underside of said plate.

59. The combination of claim 57 wherein said plastic bridge is integrally joined to said gel leg forming walls.

60. The combination of claim 27 wherein a transparent plastic bridge is positioned beneath said openings and said plate member is opaque.

61. The combination of claim 60 wherein end walls are positioned between said plastic bridge and said plate member, said walls bridge and plate forming a substantial enclosure for said gel bridge layer for holding the said layer substantially immobile.

62. The combination of claim 15 wherein separate isolating wall means are provided for each of said well pairs to isolate said well pair from its adjacent well pairs.

63. The combination of claim 62 wherein said isolating wall means are vertically downwardly extending ribs formed on a horizontally extending plate member which forms part of said supporting means, said supporting means further including a plastic bridge positioned beneath said plate in contact with said ribs.

64. The combination of claim 63 wherein said ribs are vertically divided with the upper portions thereof supported by said plate and the lower meeting portions supported by said plastic bridge.

65. The combination of claim 64 wherein a sealant is inserted between said upper and lower rib portions.

66. The combination of claim 1 wherein said gel unit is buffered to a pH in the range of about 8.2 to 8.6.

67. The combination of claim 1 wherein the rigid molding and supporting means have a composition non-reactive with electrophoretic solvents.

68. The combination of claim 1 wherein said rigid molding and supporting means includes means to hermetically seal said gel unit against syneresis.

* * * * *